(12) United States Patent
Chi (10) Patent No.: US 11,994,777 B2
(45) Date of Patent: May 28, 2024

(54) DISPLAY PANEL AND DISPLAY DEVICE (71) Applicant: SHENZHEN CHINA STAR OPTOELECTRONICS SEMICONDUCTOR DISPLAY TECHNOLOGY CO., LTD., Shenzhen (CN)

(72) Inventor: Baolin Chi, Shenzhen (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/440,185

(22) PCT Filed: Jul. 21, 2021

(86) PCT No.: PCT/CN2021/107622
§ 371 (c)(1),
(2) Date: Jan. 19, 2023

(87) PCT Pub. No.: WO2023/283976
PCT Pub. Date: Jan. 19, 2023

(65) Prior Publication Data
US 2024/0036408 A1 Feb. 1, 2024

(30) Foreign Application Priority Data
Jul. 12, 2021 (CN) .......................... 202110783902.7

(51) Int. Cl.
G02F 1/1362 (2006.01)
G02F 1/1343 (2006.01)

(52) U.S. Cl.
CPC .. *G02F 1/136218* (2021.01); *G02F 1/134363* (2013.01); *G02F 1/136286* (2013.01)

(58) Field of Classification Search
None
See application file for complete search history.

(56) References Cited

U.S. PATENT DOCUMENTS 11,119,375 B1 * 9/2021 Zhang ............... G02F 1/136218
2009/0207366 A1 8/2009 Kim

FOREIGN PATENT DOCUMENTS

CN 102799033 A 11/2012
CN 102854674 A 1/2013
(Continued)

OTHER PUBLICATIONS

Chinese Office Action issued in corresponding Chinese Patent Application No. 202110783902.7 dated Mar. 1, 2022, pp. 1-7.
(Continued)

*Primary Examiner* — Phu Vu
(74) *Attorney, Agent, or Firm* — PV IP PC; Wei Te Chung; Zhigang Ma (57) ABSTRACT The present application discloses a display panel and a display device. The display panel includes a plurality of pixel electrodes and a common electrode arranged correspondingly, and a plurality of light shielding electrodes, by opening holes on the common electrode corresponding to the light-shielding electrode or adjust a preset voltage on the light-shielding electrode, a vertical electric field is formed between the common electrode and the corresponding light-shielding electrode, which hinders a lateral movement of impurity ions and relieves a problem of line residue of currently LCD panels.

16 Claims, 4 Drawing Sheets (56) References Cited

FOREIGN PATENT DOCUMENTS

| | | |
|---|---|---|
| CN | 104360550 A | 2/2015 |
| CN | 104460137 A | 3/2015 |
| CN | 104730785 A | 6/2015 |
| CN | 104808885 A | 7/2015 |
| CN | 105607358 A | 5/2016 |
| CN | 106125415 A | 11/2016 |
| CN | 107490912 A | 12/2017 |
| CN | 107844008 A | 3/2018 |
| CN | 110082970 A | 8/2019 |
| CN | 112198698 A | 1/2021 |
| JP | 2003202597 A | 7/2003 |
| JP | 2003215539 A | 7/2003 |
| JP | 2008003376 A | 1/2008 |

OTHER PUBLICATIONS

Notification to Grant Patent Right for Invention issued in corresponding Chinese Patent Application No. 202110783902.7 dated Apr. 29, 2022, pp. 1-4.
International Search Report in International application No. PCT/CN2021/107622, dated Apr. 15, 2022.
Written Opinion of the International Searching Authority in International application No. PCT/CN2021/107622, dated Apr. 15, 2022.

* cited by examiner

DISPLAY PANEL AND DISPLAY DEVICE

RELATED APPLICATIONS

This application is a Notional Phase of PCT Patent Application No. PCT/CN2021/107622 having international filing date of Jul. 21, 2021, which claims the benefit of priority of Chinese Patent Application No. 202110783902.7 filed on Jul. 12, 2021. The contents of the above applications are all incorporated by reference as if fully set forth herein in their entirety.

FIELD OF INVENTION

The present application relates to a field of display technology and more particularly to a display panel and a display device.

BACKGROUND OF INVENTION

With the development of liquid crystal display (LCD) technology, in order to achieve high resolution, a number of pixels in the LCD panel is increasing and the pixel size is becoming smaller and smaller, so that the electric field density will also increase. At the same time, consumers have more and more demanding for the display quality of LCD products. For this reason, various manufacturers will conduct a series of reliability tests on LCD panels. For example, manufactures can test whether there is an image sticking (IS) on the LCD panel by a dot black and white checkerboard. Ordinary IS means that the LCD panel maintains a fixed grayscale image for a long time, and after switching to another grayscale image, the previous image will be retained. This phenomenon is called the IS. However, when using the dot black and white checkerboard, a light line appears at the junction of the black and white checkerboard, which can be called a line residue, and when displayed on the LCD panel, the performance of the line residue will be sharper and the senses will be worse, and with the extension of time, the phenomenon of the line residue will become more and more obvious, and a range of line residue will also increase.

Therefore, the technical problem of line residue in the currently LCD panel needs to be solved.

SUMMARY OF INVENTION

The present application provides a display panel and a display device to relieve a technical problem of line residue in the currently LCD panel.

In order to solve the above problems, the technical solutions provided by the present application are as follows:

Some embodiments of the present application provide a display panel, including a first substrate, a second substrate disposed opposite to the first substrate, and a liquid crystal layer disposed between the first substrate and the second substrate, wherein the display panel further comprises:
- a plurality of pixel electrodes disposed in an array on a side of the first substrate facing the second substrate, wherein adjacent pixel electrodes are disposed with intervals;
- a plurality of light shielding electrodes disposed in a same layer as the plurality of pixel electrodes, wherein each light-shielding electrode is correspondingly arranged in the interval; and
- a common electrode disposed on a side of the second substrate facing the first substrate;

wherein an edge of the first substrate is provided with a binding terminal, the plurality of light shielding electrodes are electrically connected to the binding terminal, and the binding terminal is configured to provide a preset voltage to the plurality of light shielding electrodes to form electric field between the common electrode and the corresponding light-shielding electrode.

In the display panel provided by one embodiment of the present application, the preset voltage of the light-shielding electrode is different from a voltage of the common electrode, and a first electric field is formed between the common electrode and the corresponding light-shielding electrode.

In the display panel provided by one embodiment of the present application, the preset voltage of the light-shielding electrode is equal to a voltage of the common electrode, and the common electrode is provided with an opening in a region opposite to the light-shielding electrode to form a second electric field between the common electrode and the corresponding light-shielding electrode.

In the display panel provided by one embodiment of the present application, the display panel is divided into a plurality of partitions, each of the partitions includes a plurality of pixel electrodes, and the common electrode corresponding to the light shielding electrode at a junction of adjacent partitions is provided with the opening.

In the display panel provided by one embodiment of the present application, an orthographic projection of the opening on the first substrate falls within a range of an orthographic projection of the light shielding electrode on the first substrate.

In the display panel provided by one embodiment of the present application, a number of the openings provided on the common electrode corresponding to each of the light shielding electrodes ranges from 2 to 20.

In the display panel provided by one embodiment of the present application, a width of the opening ranges from 6 micrometers to 15 micrometers, and a length of the opening ranges from 6 micrometers to 100 micrometers.

In the display panel provided by one embodiment of the present application, the plurality of the openings are uniformly arranged on the corresponding common electrode.

In the display panel provided by one embodiment of the present application, a shape of the opening comprises at least one shape selected from a square, a circle, a diamond, a triangle, and a trapezoid.

In the display panel provided by one embodiment of the present application, the display panel further comprises a plurality of data lines arranged in parallel and spaced along a first direction and a plurality of gate scan lines arranged in parallel and spaced along a second direction, the plurality of data lines and the plurality of gate scan lines are intersected to define a plurality of pixel regions, the plurality of pixel electrodes are respectively arranged in different pixel regions, the plurality of light shielding electrodes are disposed corresponding to the data line and/or the gate scan line, and a width of the light shielding electrode is greater than a width of the data line and a width of the gate scan line.

Some embodiments of the present application also provide a display device, which includes the display panel of one of the foregoing embodiments, and a backlight module disposed opposite to the display panel.

In the display panel and the display device provided by the present application, a vertical electric field is formed between the light-shielding electrode and the corresponding common electrode, which hinders the lateral movement of impurity ions, improves the line residue phenomenon of the LCD panel, and improves the display quality of the LCD panel.

DESCRIPTION OF FIGURES

In order to explain the embodiments or the technical solutions in the prior art more clearly, the following will briefly introduce the figures that need to be used in the description of the embodiments or the prior art. Obviously, the figures in the following description are merely some embodiments of the present application, those of ordinary skill in the art can obtain other figures based on these figures without inventive steps.

DETAILED DESCRIPTION OF EMBODIMENTS

The description of the following embodiments refers to the attached figures to illustrate specific embodiments that can be implemented in the present application. The directional terms mentioned in the present application, such as up, down, front, back, left, right, inner, outer, side, etc., are only for reference the direction of the accompany figures. Therefore, the directional terms used are used to illustrate and understand the present application, rather than to limit the present application. In the figures, units with similar structures are indicated by the same reference numerals. In the figures, a thickness of some layers and regions are exaggerated for clear understanding and ease of description. That is, a size and a thickness of each component shown in the figures are arbitrarily shown, but the present application is not limited thereto.

In view of the problem of line defect appearing at a junction of black and white checkerboards in currently LCD panels, the inventors of the present application found that an appearance of line residue is related to the degree of ion aggregation to a certain extent. Because at the junction of black and white checkerboards, a lateral electric field formed will cause the movement of ions, and then there will be a difference in brightness, forming a line residue. And over time, the more ions that move laterally, the greater the difference in brightness formed, and the more obvious the line residue. For this reason, the inventor of the present application proposes a display panel and a display device to improve the problem of line residue by hindering a lateral movement of ions.

Figure 1:
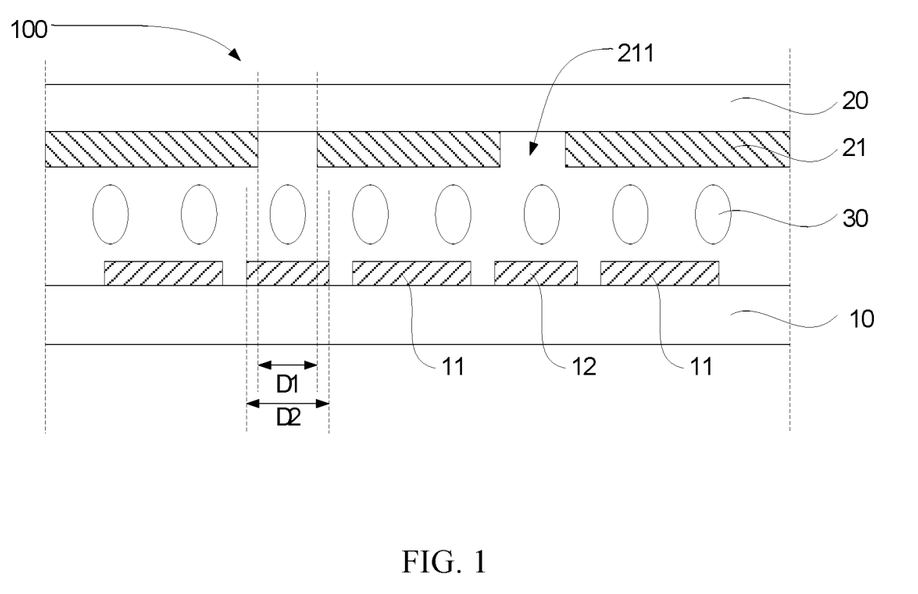
FIG. 1 is a schematic diagram of a cross-sectional structure of a display panel provided by one embodiment of the present application.
Figure 2:
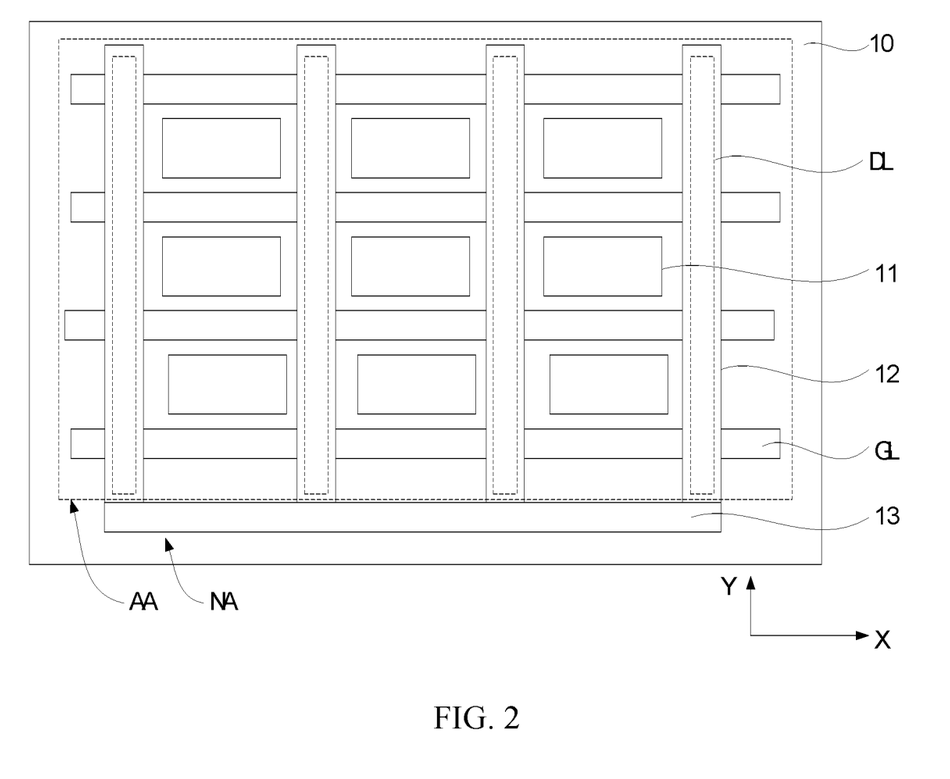
FIG. 2 is a schematic top view of the structure of a first substrate provided by one embodiment of the present application.
Figure 3:
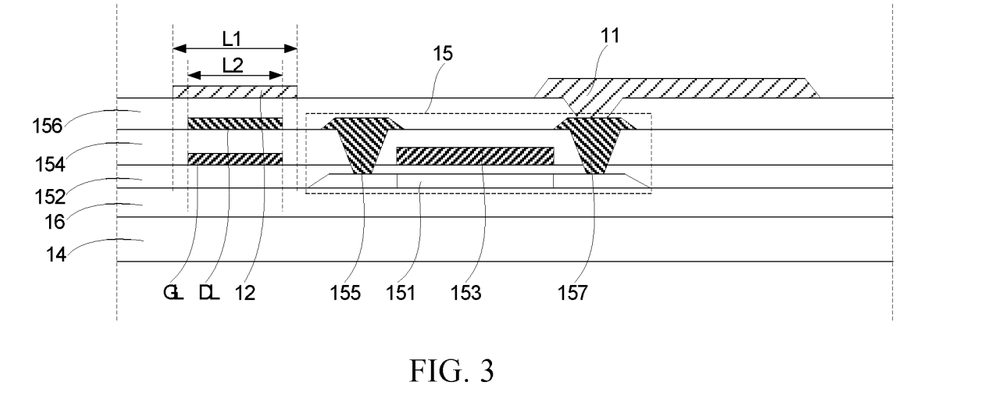
FIG. 3 is a schematic diagram of a cross-sectional structure of the first substrate provided by one embodiment of the present application.
Figure 4:
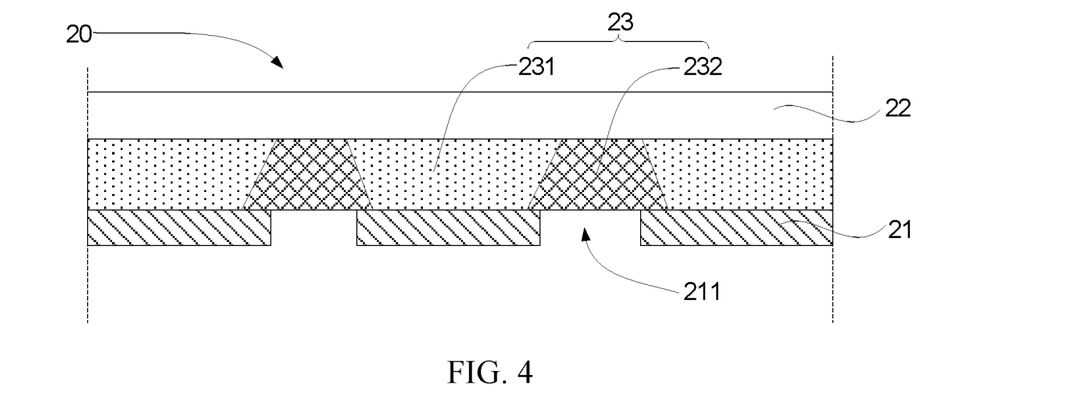
FIG. 4 is a schematic diagram of a cross-sectional structure of a second substrate provided by one embodiment of the present application.

Please refer to FIG. 1 to FIG. 4 in combination. FIG. 1 is a schematic diagram of a cross-sectional structure of a display panel provided by one embodiment of the present application. FIG. 2 is a schematic top view of the structure of a first substrate provided by one embodiment of the present application. FIG. 3 is a schematic diagram of a cross-sectional structure of the first substrate provided by one embodiment of the present application. FIG. 4 is a schematic diagram of a cross-sectional structure of a second substrate provided by one embodiment of the present application. The display panel 100 includes a first substrate 10, a second substrate 20 disposed opposite to the first substrate and a liquid crystal layer 30 disposed between the first substrate 10 and the second substrate 20.

The first substrate 10 is an array substrate, and the second substrate 20 is a color filter substrate, but the present application is not limited to this. One of the first substrate 10 and the second substrate 20 of the present application is a color-filter on array (COA) substrate, that is, the color filter is integrated on the array substrate. The liquid crystal layer 30 between the first substrate 10 and the second substrate 20 includes a plurality of liquid crystal molecules. Of course, the display panel 100 further includes a sealant (not shown) disposed between the first substrate 10 and the second substrate 20 and surrounding the plurality of liquid crystal molecules. The sealant is configured to bond the first substrate 10 and the second substrate 20.

Hereinafter, the specific structure of the display panel 100 will be described in detail by taking the first substrate 10 as an array substrate and the second substrate 20 as a color filter substrate as an example:

The first substrate 10 is provided with a plurality of pixel electrodes 11, a plurality of light shielding electrodes 12, and a binding terminal 13. The plurality of pixel electrodes 11 are disposed in an array on a side of the first substrate 10 facing the second substrate 20, wherein adjacent pixel electrodes are disposed with intervals 11. A plurality of light shielding electrodes 12 are disposed in a same layer as the plurality of pixel electrodes 11, wherein each light shielding electrode 12 is correspondingly arranged in the interval. The binding terminal 13 is disposed on an edge of the first substrate 10, the plurality of light shielding electrodes 12 are electrically connected to the binding terminal 13, and the binding terminal 13 is configured to form a predetermined voltage to the light shielding electrode 12.

The edge of the first substrate 10 can be defined as a non-display area NA of the first substrate 10, which is used for disposing the bonding terminal 13, various wirings, and driving circuits, etc., and an area surrounded by the non-display area NA can be defined as a display area AA of the first substrate 10, display units such as the plurality of pixel electrodes 11 are positioned in the display area AA.

A common electrode 21 is provided on the second substrate 20, and the common electrode 21 is provided on a side of the second substrate 20 facing the first substrate 10. The plurality of pixel electrodes 11 and the common electrode 21 are combined to control a deflection of the liquid crystal molecules.

It should be noted that the "same layer arrangement" in the present application means that in a manufacturing process, the film layer formed of the same material is patterned to obtain at least two different features, then the at least two different features are disposed in a same layer. For example, in this embodiment, the plurality of pixel electrodes 11 and the plurality of light shielding electrodes 12 are obtained by patterning a same transparent conductive film layer, then the plurality pixel electrodes 11 and the plurality of light shielding electrodes 12 are provided in the same layer. A material of the plurality of pixel electrodes 11 and the plurality of light shielding electrodes 12 includes transparent conductive materials such as indium tin oxide (ITO).

Specifically, a plurality of data lines DL arranged in parallel and spaced along a first direction X and a plurality of gate scan lines GL arranged in parallel and spaced along a second direction Y are further provided on the first substrate 10. Optionally, the first direction X is a horizontal direction, the second direction Y is a vertical direction, and an included angle between the first direction X and the second direction Y is 90 degrees. Of course, the present application is not limited to. Therefore, the included angle between the first direction X and the second direction Y in the present application may also be other included angles, such as 45 degrees, 60 degrees, and so on.

Intersections of the data lines DL and the gate scan lines GL defines a plurality of pixel regions, and the plurality of pixel electrodes 11 are respectively arranged in different pixel regions. The plurality of light shielding electrodes 12 are disposed corresponding to the data line DL and/or the gate scan line GL, and a width of the light shielding electrode 12 is greater than a width of the data line DL and a width of the gate scan line GL. The plurality of light shielding electrode 12 are configured to shield an electric field of the plurality of data lines DL and/or the plurality of gate scan lines GL to reduce light leakage. The plurality of light shielding electrodes 12 are used instead of a conventional black matrix (BM) to shield the data line DL and/or the gate scan line GL, that is, data BM less (DBS) technology, which can realize a flat screen and a curved screen are shared, and can improve a penetration rate of the display panel 100.

The positional relationship and functions of the structures on the first substrate 10 will be described in detail below:

As shown in FIG. 3, the first substrate 10 includes a first substrate 14, and a thin film transistor (TFT) 15, a pixel electrode 11, and a light shielding electrode 12 are sequentially stacked on the first substrate 14. The thin film transistor 15 is electrically connected to the pixel electrode 11, and is configured to provide a driving voltage to the pixel electrode 11.

Optionally, the first substrate 14 may be a rigid substrate or a flexible substrate, when the first substrate 14 is a rigid substrate, it may include a rigid substrate such as a glass substrate; when the first substrate 14 is a flexible substrate, it may include a flexible substrate such as a polyimide (PI) film and an ultra-thin glass film.

Optionally, a buffer layer 16 can be further provided between the first substrate 14 and the thin film transistor 15, and the buffer layer 16 can prevent undesirable impurities or pollutants (such as moisture, oxygen, etc.) diffuse from the first substrate 14 into the device that may be damaged by these impurities or contaminants.

The thin film transistor 15 includes an active layer 151, a gate insulating layer 152, a gate electrode 153, an interlayer insulating layer 154, a source electrode 155, a drain electrode 157, and a passivation layer 156 which are sequentially stacked on the buffer layer 16. The active layer 151 includes a channel region, and a source region and a drain region positioned on both sides of the channel region, and the gate electrode 153 is arranged corresponding to the channel region. The source electrode 155 and the drain electrode 157 are respectively connected to the corresponding a source electrode region and a drain region through via holes of the interlayer insulating layer 154. The pixel electrode 11 is connected to the source electrode 155 or the drain electrode 157 through the via hole of the passivation layer 156. Of course, the thin film transistor structure of the present application is not limited to this, and the thin film transistor 15 of the present application may also adopt a bottom gate structure, a double gate structure, and the like.

The gate scan line GL and the gate electrode 153 are provided in a same layer, and are configured to control the turn-on of the thin film transistor 15. The data line DL is arranged in a same layer as the source electrode 155 or the drain electrode 157, and the data line DL is configured to provide a source driving signal to the thin film transistor 15 to provide a driving voltage to the pixel electrode 11. A magnitude of the driving voltage on the pixel electrode 11 can control a deflection angle of the liquid crystal molecules, thereby controlling a brightness and a darkness of the corresponding pixels on the display panel 100, and a grayscale represents a level of different brightness from a darkest brightness to a brightest brightness. Therefore, a level of the grayscale can be used to characterize a brightness of a pixel to a certain extent. The brightness of the same pixel in high gray scale display is brighter than that in low gray scale display. Accordingly, when high gray scale is displayed, the pixel electrode 11 needs to be provided with a higher driving voltage. For example, taking an 8-bit display panel 100 as an example, the 8-bit display panel 100 can display 256 gray levels, and the 256 gray levels are divided from grayscale L0 to grayscale L255, wherein a level of the grayscale L255 represents the brightest brightness, a level of the grayscale L0 represents the darkest brightness.

The light shielding electrode 12 is arranged in a same layer as the pixel electrode 11, wherein the light shielding electrode 12 is arranged opposite to the data line DL and/or the gate scanning line GL. In this embodiment, the light shielding electrode 12 is arranged opposite to the relative arrangement of the data lines DL, wherein a width L1 of the light shielding electrode 12 is greater than a width L2 of the data line DL, so that an orthographic projection of the data line DL on the first substrate 14 completely falls within an orthographic projection of the light shielding electrode 12 on the first substrate 14 to prevent light leakage at the position corresponding to the data line DL.

The second substrate 20 disposed opposite to the first substrate 10 includes a second substrate 22, a color filter 23 disposed on a side of the second substrate 22 facing the first substrate 10, and the color filter 23 includes color films 231 with different colors and a light shielding layer 232 positioned between the color films 231 with different colors, and a material of the light shielding layer 232 includes a black matrix. The common electrode 21 is positioned on a side of the color filter 23 away from the second substrate 22. Optionally, the second substrate 22 includes a rigid substrate with high light transmittance, such as glass, so as to increase a light transmittance.

Optionally, a material of the common electrode 21 is the same as a material of the pixel electrode 11. A constant voltage with a low electrical potential is applied to the common electrode 21, and a preset voltage on the light shielding electrode 12 may be equal to a voltage on the common electrode 21, for example, it may be 0V. When a driving voltage is applied to the pixel electrode 11, an electric field is formed between the pixel electrode 11 and the common electrode 21 to deflect the liquid crystal molecules corresponding to the pixel electrode area to allow the backlight light to pass through, and the light passing through the color filter is emitted as light of a specific color. For example, the color filter includes a red color film, a green color film, and a blue color film. The light passes through the red color film and emits red light, the light passes through the green color film and emits green light, and the light passes through the blue color film and emits blue light. A pixel point on the display panel 100 can include three pixels, and the three pixels correspond to three different color films, so that the pixel point can display different colors. At the same time, by controlling the gray levels of the three pixels, it is possible to make the pixel present different colors, thereby realizing the color display of the display panel 100.

Figure 5:
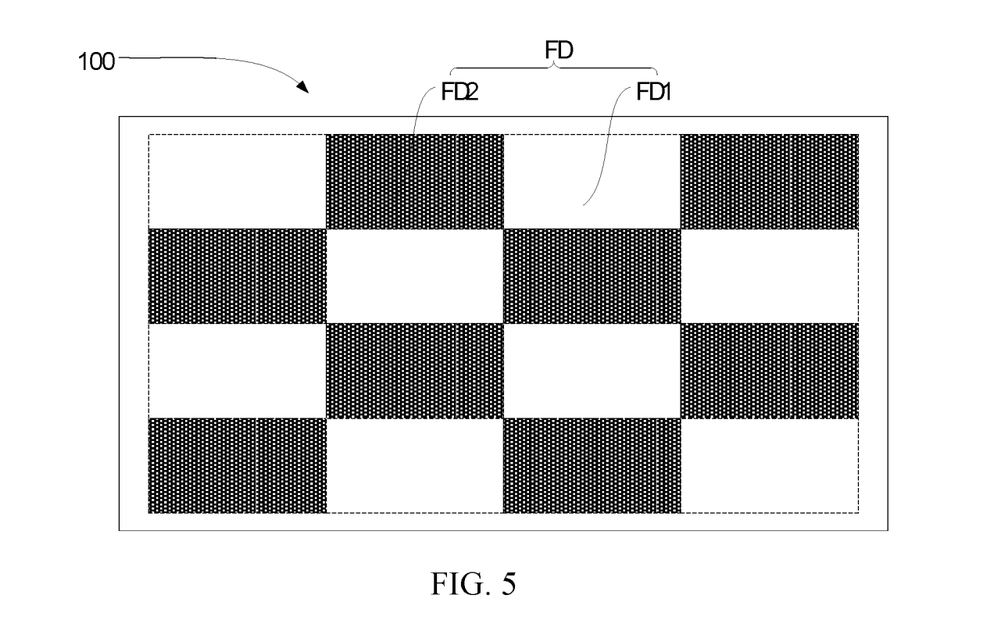
FIG. 5 is a schematic top view of the structure of a plurality of partitions of the display panel provided by one embodiment of the present application.
Figure 6:
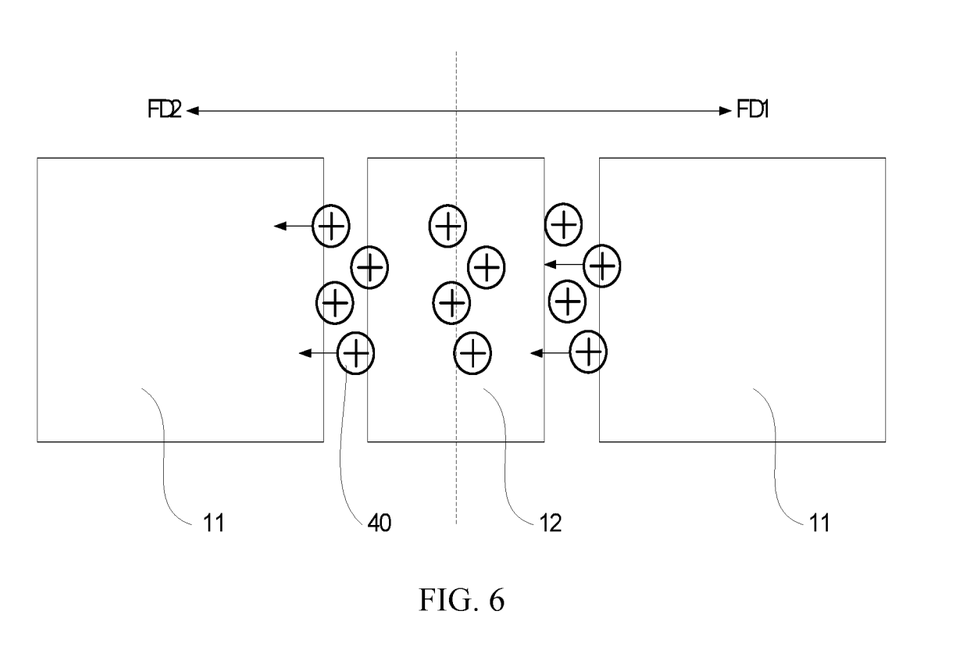
FIG. 6 is a schematic top view of a lateral movement of ions at a junction of the plurality of partitions according to one embodiment of the present application.
Figure 7:
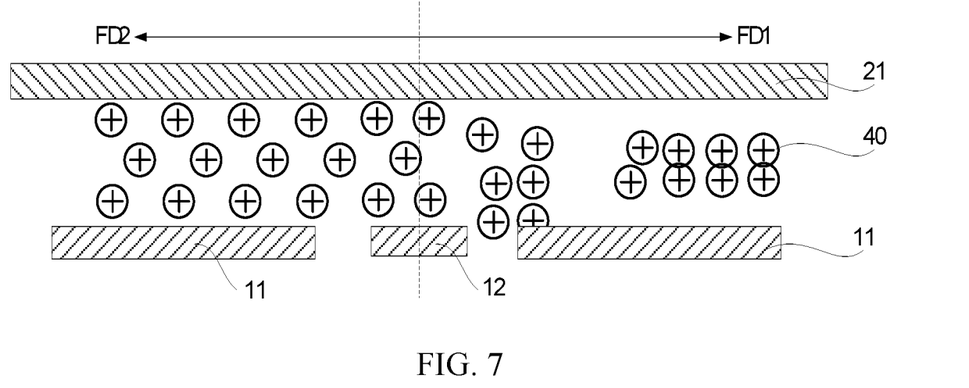
FIG. 7 is a schematic cross-sectional view of the lateral movement of ions at the junction of the plurality of partitions according to one embodiment of the present application.
Figure 8:
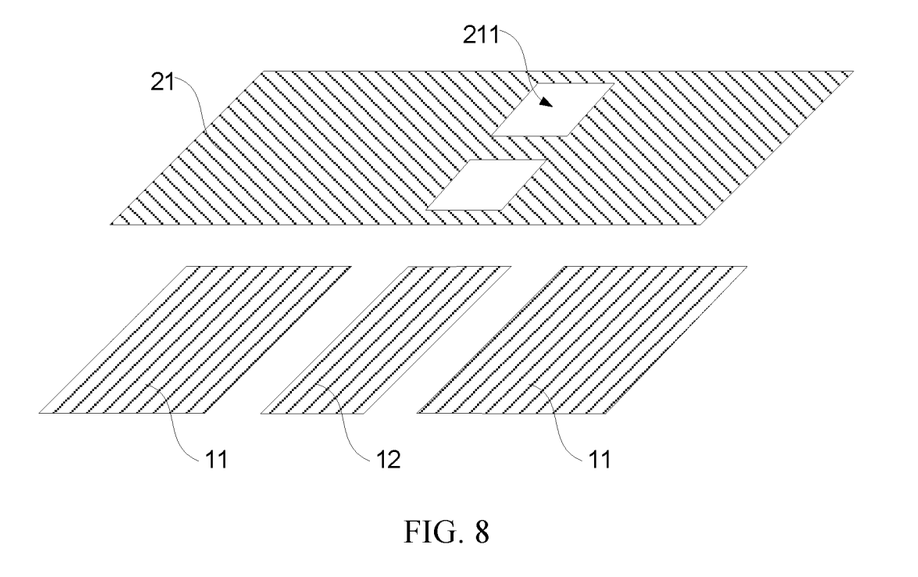
FIG. 8 is a schematic top view of a structure of a common electrode opening provided by one embodiment of the present application.

In the following, based on the inventor's research findings, a root cause of the line residue caused by the lateral movement of the ions in the display panel 100 and the principle of the present application to improve the line residue problem are specifically explained:

Please refer to FIG. 1 to FIG. 8. FIG. 5 is a schematic top view of the structure of a plurality of partitions of the display panel provided by one embodiment of the present application, FIG. 6 is a schematic top view of a lateral movement of ions at a junction of the plurality of partitions according to one embodiment of the present application. FIG. 7 is a schematic cross-sectional view of the lateral movement of ions at the junction of the plurality of partitions according to one embodiment of the present application. FIG. 8 is a schematic top view of a structure of a common electrode opening provided by one embodiment of the present application. When performing a checkerboard test on the display panel 100, the display panel 100 is divided into a plurality of partitions FD, each partition FD is equivalent to a checkerboard, and each partition FD is provided with a plurality of pixel electrodes 11, that is, each partition FD includes a plurality of pixels. When the checkerboard is clicked, two adjacent partitions FD show different colors. For example, all pixels of a partition FD are switched to the grayscale L0, so that the partition FD displays black, all pixels of an adjacent partition FD are switched to the grayscale L255 makes the partition FD appear white. Then by switching all the pixels in the partition FD displaying black to the grayscale L255, so that the partition FD is switched from black to white, at the same time, switching all pixels in the adjacent partition FD displaying white to the grayscale L0, so that the partition FD is switched from white to black. In this way, by cyclically switching the grayscale of the partition FD, the color of the partition FD is switched between black and white.

It should be noted that, for a convenience of description, the partition FD displaying white is described as a white area FD1, and the partition FD displaying black is described as a black area FD2. In the two adjacent partitions FD, the pixels in the white area FD1 are displayed at the grayscale L255, and the pixels in the black area FD2 are displayed at the grayscale L0. Accordingly, a driving voltage on the pixel electrode 11 of the pixel in the white area FD1 is greater than a driving voltage on the pixel electrode 11 of the pixel in the black area FD2. The preset voltage on the light shielding electrode 12 between the pixels is equal to the voltage on the common electrode 21, which is a constant low potential, such as 0V. Therefore, the driving voltage on the pixel electrode 11 of the pixel in the white area FD1 and the driving voltage on the pixel electrode 11 of the pixels in the black area FD2 are all greater than the preset voltage on the light shielding electrodes 12.

In this way, at a junction of the adjacent white area FD1 and the black area FD2, a lateral electric field is formed between the pixel electrode 11 at an edge of the white area FD1 and the light shielding electrode 12, and a direction of the electric field is directed from the pixel electrode 11 of the white area FD1 to the light shielding electrode 12. At the same time, the lateral electric field is also formed between the pixel electrode 11 near an edge of the black area FD2 of the white area FD1 and the light shielding electrode 12, and a direction of the electric field is directed from the pixel electrode 11 of the black area FD2 to the light shielding electrode 12. However, because a driving voltage of the white area FD1 pixel electrode 11 is greater than a driving voltage of the black area FD2 pixel electrode 11, an electric field force between the white area FD1 pixel electrode 11 and the light shielding electrode 12 is greater than that of the black area FD2 pixel electrode 11 and the light shielding electrode 12. Therefore, an overall electric field force is directed from the white area FD1 to the black area FD2. In this way, the ions 40 in the white area FD1 will move laterally to the black area FD2 and diffused in the black area FD2, resulting in a line residue at the junction of the white area FD1 and the black area FD2.

It should be noted that in the liquid crystal layer 30 between the first substrate 10 and the second substrate 20, the liquid crystal molecules, the sealant, and the alignment film may contain impurity ions, so that the entire liquid crystal layer 30 are dispersed impurity ions, and these impurity ions are in a state of equilibrium. When the electric field at the junction of the white area FD1 and the black area FD2 causes the ion to move, the equilibrium state of the ion 40 is broken, and a pressure difference between the first substrate 10 and the second substrate 20 changes, resulting in a difference in brightness of the white area FD1 and the black area FD2. Especially near the boundary of the white area FD1 and the black area FD2, a pressure difference between the upper and lower plates of the pixel is the largest. Therefore, when switching the grayscale picture, the line residue appears at the junction of the white area FD1 and the black area FD2 due to a difference of the electric potential.

In the present application, a vertical electric field is formed between the light shielding electrode 12 and the corresponding common electrode 21 to hinder the lateral movement of the ions 40, so as to improve the appearance of line residue.

Specifically, a preset voltage of the light shielding electrode 12 is equal to a voltage of the common electrode 21, and the common electrode 21 is provided with an opening 211 in a region corresponding to the light shielding electrode 12. Due to an existence of the opening 211, the electric field direction and the electric field range are changed, forming an electric field difference, so that a second electric field is formed between the light shielding electrode 12 and the corresponding common electrode 21, the second electric field is a vertical electric field, and an existence of the vertical electric field can hinder the lateral movement of the ions 40, so as to improve the line residual problem.

A number of the light shielding electrodes 12 is multiple, and the area of the common electrode 21 corresponding to each light shielding electrode 12 is provided with an opening 211, wherein a number of the opening 211 may be multiple. Further, an orthographic projection of the opening 211 on the first substrate 10 falls within a range of the orthographic projection of the light shielding electrode 12 on the first substrate 10, so that a size of the opening 211 on the common electrode 21 is smaller than a size of the corresponding light shielding electrode 12 to prevent the opening 211 on the common electrode 21 from leaking light.

Therefore, a specific number and a size of the openings 211 depend on a size of the light shielding electrode 12, and at the same time, a risk of light leakage that the openings 211 may bring must be taken into consideration. Specifically, a size of the light shielding electrode 12 includes a length and a width of the light shielding electrode 12. As shown in FIG. 1, a width D1 of the opening 211 is smaller than a width D2 of the light shielding electrode 12. Optionally, the width of the opening 211 ranges from 6 micrometers to 15 micrometers, and the length of the opening 211 ranges from 6 micrometers to 100 micrometers. A number of openings 211 provided on the common electrode 21 corresponding to each of the light shielding electrodes ranges from 2 to 20.

At the same time, the plurality of openings 211 on the common electrode 21 are evenly arranged, so that the vertical electric field formed between the light shielding electrode 12 and the corresponding common electrode 21 is evenly distributed, which can better hinder a lateral movement of the ions 40.

Optionally, a shape of the opening 211 selected from at least one or a combination of regular shapes such as a square, a circle, a diamond, a triangle, and a trapezoid. Setting the opening 211 into a regular shape will facilitate the implementation of the manufacturing process.

In this embodiment, the preset voltage of the light shielding electrode 12 is equal to the voltage of the common electrode 21, by providing the opening 211 in the area of the common electrode 21 corresponding to the light shielding electrode 12, the vertical electric field is formed between the light shielding electrode 12 and the corresponding common electrode 21 to hinder the lateral movement of the ions 40, thereby improving the line residue problem.

In one embodiment, a difference from the foregoing embodiment is that the display panel 100 is divided into a plurality of partitions FD, each of the partitions FD includes a plurality of pixel electrodes 11, and the common electrode 21 corresponding to the light shielding electrode 12 at the junction of the adjacent partitions FD is provided with the opening 211. That is, it is only necessary to provide an opening 211 on the common electrode 21 corresponding to the light shielding electrode 12 at the junction of the white area FD1 and the black area FD2. A vertical electric field is formed between the light shielding electrode 12 and the common electrode 21 at the junction of the white area FD1 and the black area FD2 to hinder the lateral movement of the ions 40. In this way, the line residue can also be improved, and since the opening 211 on the common electrode 21 is reduced, a risk of light leakage caused by the opening 211 is reduced. For other descriptions, please refer to the above-mentioned embodiment, which will not be repeated here.

In one embodiment, a difference from the foregoing embodiment is that a preset voltage of the light shielding electrode 12 is different from a voltage of the common electrode 21. By adjusting the preset voltage of the light shielding electrode 12, the preset voltage of the light shielding electrode 12 is different from the voltage of the common electrode 21, so that a first electric filed between the light shielding electrode 12 and the corresponding common electrode 21 is formed. The first electric field is a vertical electric field, which can also hinder the lateral movement of the ions 40 to improve the line residue, wherein an electric field force of the first electric field can be equal to an electric field force of the second electric field. In this way, in terms of hindering the lateral movement of ions to improve the problem of wire residue, the present application can achieve the same effect as adjusting the preset voltage of the light shielding electrode 12 by physically perforating the common electrode 21. For other descriptions, please refer to the above-mentioned embodiment, which will not be repeated here.

One embodiment of the present application also provides a display device, which includes the display panel 100 of one of the foregoing embodiments, a backlight module disposed opposite to the display panel 100, a cover plate covering the display panel 100, and the like. The cover plate is configured to protect the display panel 100, and the backlight module is configured to provide backlight to the display panel 100.

According to the above embodiment, it can be seen that:

The present application provides a display panel and a display device. The display panel includes a first substrate, a second substrate disposed opposite to the first substrate, and a liquid crystal layer disposed between the first substrate and the second substrate, a plurality of pixel electrodes disposed in an array on a side of the first substrate facing the second substrate, wherein adjacent pixel electrodes are disposed with intervals; a plurality of light shielding electrodes disposed in a same layer as the plurality of pixel electrodes, wherein each light-shielding electrode is correspondingly arranged in the interval; and a common electrode disposed on a side of the second substrate facing the first substrate, and an electric field formed between the common electrode and the corresponding light-shielding electrode. In the present application, a hole is provided on the common electrode corresponding to the light-shielding electrode or the preset voltage on the light-shielding electrode is adjusted to be different from the voltage on the common electrode, so that the vertical electric field is formed between the common electrode and the corresponding light-shielding electrode. The vertical electric field hinders a lateral movement of impurity ions, so as to alleviate the problem of line residue in currently LCD panels.

In the above-mentioned embodiments, the description of each embodiment has its own emphasis. For parts that are not described in detail in an embodiment, reference may be made to related descriptions of other embodiments.

The embodiments of the present application are described in detail above, and specific embodiments are used in the specification to explain the principles and implementation of the present application. The descriptions of the above embodiments are only used to help understand the technical solutions and core ideas of the present application. Those of ordinary skill in the art should understand that they can still modify the technical solutions described in the foregoing embodiments, or make equivalent replacements to some of the technical features. However, these modifications or replacements do not cause the essence of the corresponding technical solutions to deviate from the scope of the technical solutions of the embodiments of the present application.

What is claimed is:

1. A display panel, comprising:
  a first substrate, a second substrate disposed opposite to the first substrate, and a liquid crystal layer disposed between the first substrate and the second substrate, wherein the display panel further comprises:
  a plurality of pixel electrodes disposed in an array on a side of the first substrate facing the second substrate, wherein adjacent pixel electrodes are disposed with intervals;
  a plurality of light shielding electrodes disposed in a same layer as the plurality of pixel electrodes, wherein each light-shielding electrode is correspondingly arranged in the interval; and
  a common electrode disposed on a side of the second substrate facing the first substrate;
  wherein an edge of the first substrate is provided with a binding terminal, the plurality of light shielding electrodes are electrically connected to the binding terminal, and the binding terminal is configured to provide a preset voltage to the plurality of light shielding electrodes to form electric field between the common electrode and the corresponding light-shielding electrode;

wherein the preset voltage of the light-shielding electrode is equal to a voltage of the common electrode, and the common electrode is provided with an opening in a region opposite to the light-shielding electrode to form a vertical electric field between the common electrode and the corresponding light-shielding electrode.

2. The display panel according to claim 1, wherein the display panel is divided into a plurality of partitions, each of the partitions includes a plurality of pixel electrodes, and the common electrode corresponding to the light shielding electrode at a junction of adjacent partitions is provided with the opening.

3. The display panel according to claim 2, wherein an orthographic projection of the opening on the first substrate falls within a range of an orthographic projection of the light shielding electrode on the first substrate.

4. The display panel according to claim 3, wherein a number of the openings provided on the common electrode corresponding to each of the light shielding electrodes ranges from 2 to 20.

5. The display panel according to claim 4, wherein a width of the opening ranges from 6 micrometers to 15 micrometers, and a length of the opening ranges from 6 micrometers to 100 micrometers.

6. The display panel according to claim 4, wherein the plurality of the openings are uniformly arranged on the corresponding common electrode.

7. The display panel according to claim 3, wherein a shape of the opening comprises at least one shape selected from a square, a circle, a diamond, a triangle, and a trapezoid.

8. The display panel according to claim 1, wherein the display panel further comprises a plurality of data lines arranged in parallel and spaced along a first direction and a plurality of gate scan lines arranged in parallel and spaced along a second direction, the plurality of data lines and the plurality of gate scan lines are intersected to define a plurality of pixel regions, the plurality of pixel electrodes are respectively arranged in different pixel regions, the plurality of light shielding electrodes are disposed corresponding to the data line and/or the gate scan line, and a width of the light shielding electrode is greater than a width of the data line and a width of the gate scan line.

9. A display device comprising a display panel, and a backlight module disposed opposite to the display panel, wherein the display panel comprises a first substrate, a second substrate disposed opposite to the first substrate, and a liquid crystal layer disposed between the first substrate and the second substrate, and wherein the display panel further comprises:

a plurality of pixel electrodes disposed in an array on a side of the first substrate facing the second substrate, wherein adjacent pixel electrodes are disposed with intervals;

a plurality of light shielding electrodes disposed in a same layer as the plurality of pixel electrodes, wherein each light-shielding electrode is correspondingly arranged in the interval; and a common electrode disposed on a side of the second substrate facing the first substrate;

wherein an edge of the first substrate is provided with a binding terminal, the plurality of light-shielding electrode are electrically connected to the binding terminal, and the binding terminal is configured to provide a preset voltage to the plurality of light shielding electrodes to form electric field between the common electrode and the corresponding light-shielding electrode;

wherein the preset voltage of the light-shielding electrode is equal to a voltage of the common electrode, and the common electrode is provided with an opening in a region opposite to the light-shielding electrode to form a vertical electric field between the common electrode and the corresponding light-shielding electrode.

10. The display device according to claim 9, wherein the display panel is divided into a plurality of partitions, each of the partitions includes a plurality of pixel electrodes, and the common electrode corresponding to the light shielding electrode at a junction of adjacent partitions is provided with the opening.

11. The display device according to claim 10, wherein an orthographic projection of the opening on the first substrate falls within a range of an orthographic projection of the light shielding electrode on the first substrate.

12. The display device according to claim 11, wherein a number of the openings provided on the common electrode corresponding to each of the light shielding electrodes ranges from 2 to 20.

13. The display device according to claim 12, wherein a width of the opening ranges from 6 micrometers to 15 micrometers, and a length of the opening ranges from 6 micrometers to 100 micrometers.

14. The display device according to claim 12, wherein the plurality of the openings are uniformly arranged on the corresponding common electrode.

15. The display device according to claim 11, wherein a shape of the opening comprises at least one shape selected from a square, a circle, a diamond, a triangle, and a trapezoid.

16. The display device according to claim 9, wherein the display panel further comprises a plurality of data lines arranged in parallel and spaced along a first direction and a plurality of gate scan lines arranged in parallel and spaced along a second direction, the plurality of data lines and the plurality of gate scan lines are intersected to define a plurality of pixel regions, the plurality of pixel electrodes are respectively arranged in different pixel regions, the plurality of light shielding electrodes are disposed corresponding to the data line and/or the gate scan line, and a width of the light shielding electrode is greater than a width of the data line and a width of the gate scan line.

* * * * *